United States Patent Office.

ISRAEL YOUNT, OF GETTYSBURG, PENNSYLVANIA.

Letters Patent No. 67,012, dated July 23, 1867.

---

IMPROVED MEDICAL COMPOUND.

---

The Schedule referred to in these Letters Patent and making part of the same.

---

TO ALL WHOM IT MAY CONCERN:

Be it known that I, ISRAEL YOUNT, of Gettysburg, in the county of Adams, and State of Pennsylvania, have invented a new and improved Medical Compound; and I do hereby declare the following to be a full, clear, and exact description of the same, sufficient to enable those skilled in the art to which the invention appertains to fully understand and use the same.

This compound has been thoroughly tested and proved to be a specific for the cure of diphtheria.

I take seven ounces of gunpowder, three ounces of alum, two ounces sulphur, one ounce of Epsom salts, and one ounce of rhubarb, all of which I pulverize thoroughly and mix well together, and it is ready for use for the purpose specified above.

The medicine, thus compounded, is to be administered to adults in doses of one tea-spoonful of the mixture in two table-spoonfuls of pure vinegar, the dose to be repeated at short intervals, as the case may require. The dose for infants will be proportionately less.

Having thus described my invention, what I claim as new, and desire to secure by Letters Patent, is-

The medicine compounded as above described, substantially as and for the purpose specified.

<div align="right">ISRAEL YOUNT.</div>

Witnesses:
    F. B. PICKING,
    ALEXANDER SPANGLER.